United States Patent [19]
Jacobsen

[11] Patent Number: 5,953,068
[45] Date of Patent: *Sep. 14, 1999

[54] REPRODUCING DECOMPRESSED AUDIO-VIDEO DATA USING AN EXTERNAL VIDEO SIGNAL TO PRODUCE CLOCK SIGNALS

[75] Inventor: Michael Jacobsen, Halstenbek, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/491,009

[22] Filed: Jun. 15, 1995

[30] Foreign Application Priority Data

Jun. 28, 1994 [DE] Germany ............... 44 22 615

[51] Int. Cl.$^6$ ............... H04N 5/04
[52] U.S. Cl. ............... 348/512; 348/845.2; 348/584
[58] Field of Search ............... 348/512, 510, 348/501, 502, 500, 505, 506, 507, 508, 513, 521, 522, 523, 524, 536, 537, 552, 578, 423, 464, 465, 461, 845.2, 584, 589; 345/115; H04N 9/475, 5/04, 5/262, 5/265, 5/272

[56] References Cited

U.S. PATENT DOCUMENTS

| | | | |
|---|---|---|---|
| 4,580,165 | 4/1986 | Patton et al. | 358/148 |
| 4,670,774 | 6/1987 | Tokui | 358/19 |
| 5,065,231 | 11/1991 | Greaves et al. | 358/22 |
| 5,185,603 | 2/1993 | Medin | 340/814 |
| 5,229,855 | 7/1993 | Siann | 358/183 |
| 5,287,182 | 2/1994 | Haskell et al. | 348/500 |
| 5,293,540 | 3/1994 | Trani et al. | 348/584 |
| 5,406,306 | 4/1995 | Siann et al. | 345/115 |
| 5,541,666 | 7/1996 | Zeidler et al. | 348/589 |

Primary Examiner—Chris Grant
Attorney, Agent, or Firm—Laurie E. Gathman

[57] ABSTRACT

For an arrangement for reproducing decompressed video and/or audio data at a video and an audio reproduction clock frequency, the arrangement comprises a circuit for generating the video and/or audio reproduction clock, which the circuit derives the reproduction clocks from the externally supplied digital video signal, for the purpose of synchronizing these data and for a possibly joint representation by an external video signal.

7 Claims, 1 Drawing Sheet

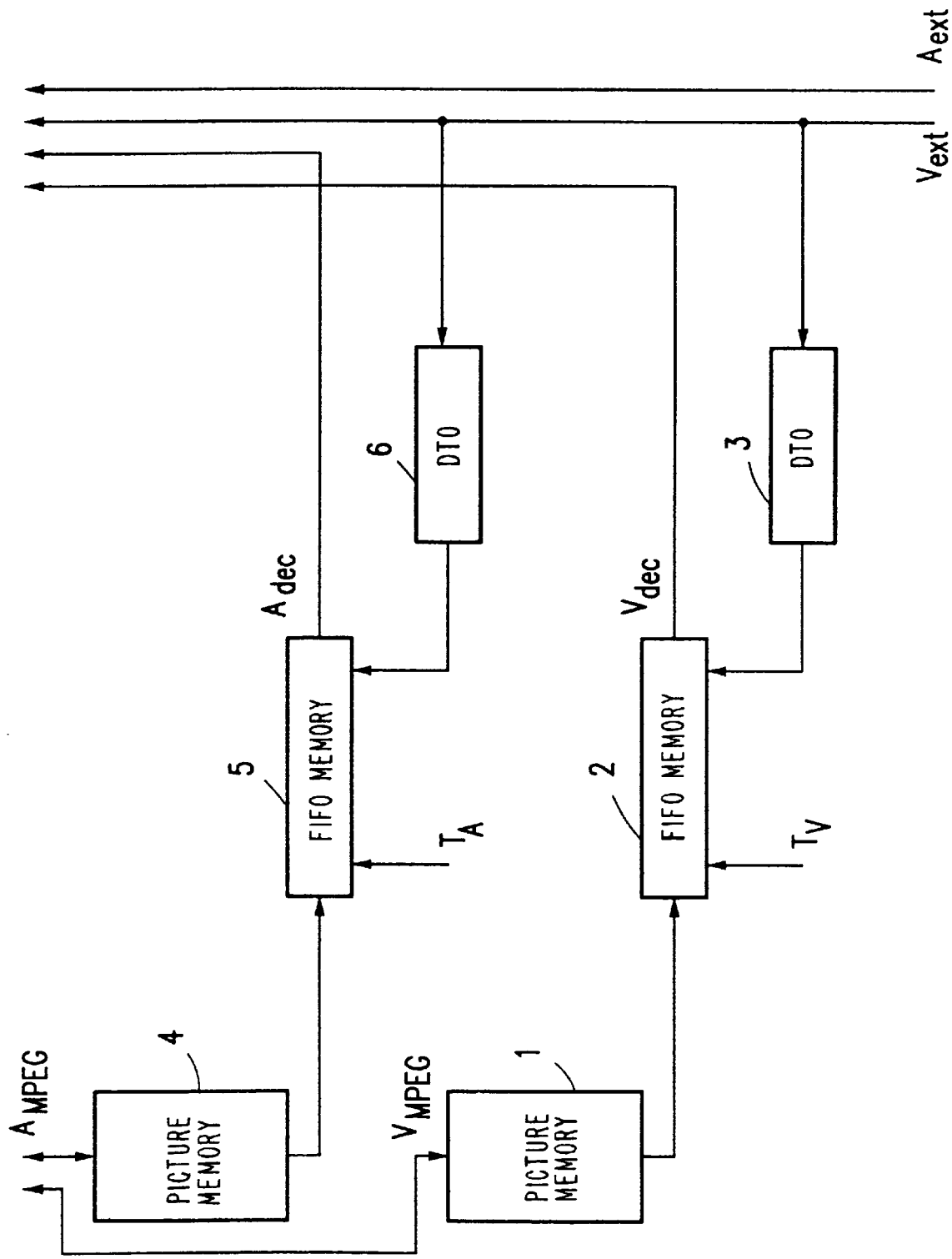

REPRODUCING DECOMPRESSED AUDIO-VIDEO DATA USING AN EXTERNAL VIDEO SIGNAL TO PRODUCE CLOCK SIGNALS

BACKGROUND OF THE INVENTION

The invention relates to an arrangement for reproducing decompressed video and/or audio data at a video and/or audio reproduction clock frequency.

Video and/or audio data which are available in a compressed form and are decompressed for reproduction, are represented in a fixed reproduction clock. For combined video and/or audio data, these clocks may be independent of each other and have different frequencies.

If such a decompressed video and/or audio signal is represented together with other video and possibly audio signals, the problem occurs that these data are not synchronized with each other, which leads to interference in picture and/or sound.

SUMMARY OF THE INVENTION

It is an object of the invention to provide an arrangement which eliminates these problems.

According to the invention, this object is solved in that means for generating the video and/or audio reproduction clock are provided, which means derive these reproduction clocks from an externally supplied digital video signal.

The externally supplied digital video signal is used for generating the reproduction clock of the video and/or audio signal which has been produced from compressed data. The video signal, gained from compressed data, is then reproduced at a clock frequency which has a fixed relation to the clock frequency of the externally applied digital video signal. Consequently, both these video signals are synchronized with each other so that a combined representation is possible. This representation may consist of, for example fading between the signals, mixing the signals, or the like. Interference neither occurs any longer when there is a switch-over between the two signals.

In accordance with an embodiment of the invention, in the simplest case the reproduction clocks for reproducing the compressed video and/or audio data may be derived from the sampling clock of the externally supplied video signal. Each digital video signal has a sampling clock which can directly be used as a reproduction clock, for example for the decompressed video data. The two video signals are then automatically synchronized.

In accordance with a further embodiment of the invention, the sampling clock of the externally supplied video signal may be derived from its horizontal synchronizing pulses. This has the advantage that a correct reproduction of the two video signals is guaranteed, also at fluctuations of the time base as generated, for example by video recorders.

In accordance with a further embodiment, the compressed video and/or audio data which are decompressed before reproduction can be decompressed, for example in accordance with the Moving Pictures Expert Group (MPEG) Recommendation. The compression and decompression method is increasingly being used for digital video data and also contains rules for compressing audio data.

In accordance with a further embodiment of the invention, the means for generating the video and audio reproduction clocks include at least a Discrete Time Oscillator (DTO) which is clocked in dependence upon the sampling clock of the externally supplied video signal.

Such a discrete time oscillator (DTO) has an input adder which receives a constant input signal and the output signal of a register whose input is connected to the output of the adder stage. Since the overflow of the output signal of the adder stage is not taken into account, such an oscillator generates digital data at its output, which data represent a sawtooth-shaped signal. As desired, a sine-wave signal or a square-wave signal can be derived from this signal. The operating clock of this DTO results from the clock at which the register is clocked. For the arrangement according to the invention it is advantageous to clock this register in dependence upon the sampling clock of the externally supplied video signal, because the output signal of the DTO is then dependent on the sampling clock of the video signal. The output signal of the DTO may again be used for generating the video and/or audio reproduction clock of the decompressed data. This results in a dependence between the sampling clock of the external video signal and the reproduction clocks of the decompressed video and/or audio data. However, the sampling frequencies may be different. Alternatively, the video sampling frequencies may be chosen to be different when a DTO is used for generating the video reproduction clock. A further advantage is that the reproduction clock frequencies for the two signals can be freely chosen and can even be switched, dependent on the input signal. This means that different reproduction clock frequencies can be chosen which are, however, dependent on the sampling clock of the externally supplied video signal.

A further advantageous embodiment, as claimed in a further sub-claim, is characterized in that the video reproduction clock is derived from the audio reproduction clock, or the audio reproduction clock is derived from the video reproduction clock. The reproduction clocks for a video signal and an audio signal need not be separately gained from the externally supplied digital video signal, but only one of the clocks can be directly gained from the video signal, whereas the other clock is derived from that clock which in its turn is derived from the externally supplied video signal.

For decompressing encoded data in accordance with the MPEG Recommendation, a System Time Clock (STC) is required which has a frequency of 90 kHz. For the arrangement according to the invention it is advantageously possible to derive this STC clock from the video and/or audio reproduction clock gained in dependence upon the externally supplied video signal. The decompression of the data is then already adapted to clock fluctuations of the external video signal.

In accordance with a further embodiment of the invention, the arrangement may be used in a computer, particularly a personal computer, which in addition to decompression of the video and/or audio data can also control the reproduction or even realises this itself via its computer display screen. In this case, the external digital video signal is to be applied to the computer, from which signal the reproduction clock is generated, for example on an insert card which is connected to the computer bus.

BRIEF DESCRIPTION OF THE DRAWINGS

FIG. 1 shows an arrangement for reproducing decompressed video and/or audio data at a video and/or audio reproduction clock frequency;

These and other aspects of the invention will be apparent from and elucidated with reference to the embodiment described hereinafter.

DETAILED DESCRIPTION OF THE PREFERRED EMBODIMENTS

The drawing shows a FIGURE in which both compressed video data and compressed audio data are decompressed, for example in accordance with the MPEG Recommendation. The reproduction clocks are generated in dependence upon an externally supplied video signal which is denoted by $V_{ext}$ in the FIGURE. An audio signal, which is denoted by $A_{ext}$ in the FIGURE, may be associated with this externally supplied video signal. At least the signal $V_{ext}$ is a digital signal which thus has a sampling clock which can advantageously be used for generating the reproduction clocks of the decompressed video and/or audio signals. A frequency of 27 MHz is often chosen as a reproduction clock, which may advantageously be derived from the horizontal synchronizing part of the video signal.

The FIGURE shows a picture memory 1 in which a signal denoted by $V_{MPEG}$ in the FIGURE is stored and decompressed. This signal which is compressed in accordance with the MPEG Recommendation is decompressed in the picture memory by means of external controls (not shown) and made available as a digital picture signal. Dependent on a fixed quartz clock $T_V$, this signal is written into a FIFO memory 2. The decompressed video signal is not yet synchronized with the clock of the externally supplied video signal $V_{ext}$. The signal is read from the FIFO memory 2 in dependence upon the output signal of a DTO (Discrete Time Oscillator) whose input receives the sampling clock of the video signal $V_{ext}$. Within the DTO, a register, whose output signal is fed back to an input of an adder stage, is clocked with this sampling clock of the signal $V_{ext}$ in a way which is not shown in the FIGURE. The other input of the adder stage receives a constant signal in a way which is not shown in the FIGURE. The output signal of the adder stage is applied to the clocked register, but the overflow of the output signal of the adder stage is not applied to this register. The register itself generates digital data which have a sawtooth-shaped variation because the overflow signal has not been taken into account. If necessary, further stages may follow the register, which stages generate a sine-wave or a square-wave signal as a clock signal from these data representing a sawtooth-shaped variation. The data are read from the FIFO memory 2 under the control of this clock signal. These decompressed data, which are denoted by $V_{dec}$ in the FIGURE, are now synchronized with the external video signal $V_{ext}$ as far as their clock is concerned and may be reproduced jointly with this video signal.

It is to be noted that the read clock from the FIFO 2 may be identical to the sampling clock of the external video signal $V_{ext}$. In this case, the DTO 3 may be dispensed with.

The FIGURE shows a further memory 4 which receives audio data which may be associated, for example with the video signal $V_{MPEG}$ with which they are to be jointly reproduced. These data have, however, a much lower sampling clock, for example 44.1 kHz. These data are denoted by $A_{MPEG}$ in the FIGURE and are made available in the picture memory 4 by means of external controls (not shown). These data are written into a FIFO memory 5 in dependence upon a fixed quartz clock $T_A$.

The data are read from the FIFO memory 5 in dependence upon the output signal of a further DTO 6 whose input receives the sampling clock of the external video signal $V_{ext}$. In principle, this DTO operates in an identical manner as the DTO 3, but generates an output clock of a clearly lower frequency which in accordance with the desired frequency of the reproduction clock is suitable for the audio data. In dependence upon this clock, the data, denoted by $A_{dec}$ in the FIGURE, are read and are available for reproduction.

Both the reproduction clock of the decompressed video data and the reproduction clock of the decompressed audio data are then adapted to the sampling clock of the externally supplied video signal $V_{ext}$. Possibly occurring fluctuations of this sampling clock, for example due to fluctuations of the time base of this signal, are taken into account in the reproduction clocks of both the data of the decompressed video signal and in those of the audio signal. A joint representation of the two signals is then possible, for example in the form of mixing the signals or by fading between the video signals. A synchronous reproduction of the decompressed audio data in relation to the decompressed video data is then also ensured.

The arrangement shown in the FIGURE may be provided in a computer on an insert card which is connected to the bus system of the computer. The external digital video signal is applied to the insert card. The further arrangement as shown in the FIGURE is also provided on this card. The data may be displayed on the computer monitor, but they may also be made externally available for display on another picture display device.

I claim:

1. An arrangement for reproducing decompressed video and audio data at a system time clock frequency, comprising:
   means for generating a video and audio reproduction clock from an externally supplied digital video signal and for deriving a system time clock from the reproduction clock; and
   means for reproducing the video and audio data at the system time clock frequency.

2. An arrangement as claimed in claim 1, characterized in that the means for generating the reproduction clock is from the sampling clock of the externally supplied video signal.

3. An arrangement as claimed in claim 2, characterized in that the sampling clock of the externally supplied video signal is derived from its horizontal synchronizing pulses.

4. An arrangement as claimed in claim 1, characterized in that the video and/or audio data are decompressed in accordance with the Moving Pictures Expert Group (MPEG) Recommendation, ISO 11172.

5. An arrangement as claimed in claim 1, characterized in that the means for generating the video and audio reproduction clocks include at least a Discrete Time Oscillator (3; 4) (DTO) which is clocked in dependence upon the sampling clock of the externally supplied video signal.

6. An arrangement as claimed in claim 1, characterized in that the video reproduction clock is derived from the audio reproduction clock, or the audio reproduction clock is derived from the video reproduction clock.

7. Use of the arrangement as claimed in claim 1 in a computer which also decompresses the video and audio data.

* * * * *